United States Patent [19]

Poncelet et al.

[11] Patent Number: 4,634,231
[45] Date of Patent: Jan. 6, 1987

[54] GLASS FOR PANORAMIC ROOF

[75] Inventors: Denis Poncelet, Thourotte; Jean-Claude Coulon, Mercurey; Jacques Chaumette, Thourotte; Pierre Letourneur, Paris, all of France

[73] Assignee: Saint-Gobain Vitrage, Aubervilliers, France

[21] Appl. No.: 591,848

[22] Filed: Mar. 21, 1984

[30] Foreign Application Priority Data

Mar. 23, 1983 [FR] France .................. 83 04736

[51] Int. Cl.⁴ .......................... G02B 26/00; G02B 5/26
[52] U.S. Cl. ...................................... 350/311; 296/218
[58] Field of Search ................ 350/1.1, 1.4, 1.7, 311, 350/319, 283, 280; 296/218, 219

[56] References Cited

U.S. PATENT DOCUMENTS

| | | | |
|---|---|---|---|
| 3,887,744 | 1/1975 | Tomita et al. | 350/1.1 |
| 3,978,272 | 8/1976 | Donley | 350/311 |
| 4,085,999 | 4/1978 | Chahroudi | 350/1.1 |
| 4,179,181 | 12/1979 | Chang | 350/1.7 |
| 4,428,170 | 1/1984 | Wooten et al. | 296/218 |

FOREIGN PATENT DOCUMENTS 1389624  1/1965  France ................. 350/280

Primary Examiner—John K. Corbin
Assistant Examiner—Loha Ben
Attorney, Agent, or Firm—Oblon, Fisher, Spivak, McClelland, & Maier

[57] ABSTRACT

A glass sheet suitable for use as the panoramic roof of a motor vehicle is disclosed, the sheet being comprised of a tinted glass coated with a network of enamel patterns which reduce the light and energy transmission factor of the formed glass. The glass may optionally include a thin semireflective layer deposited on one side of the glass. Preferably, the light transmission factor and energy transmission factor of the coated glass sheet are approximately equal, and below 30%.

13 Claims, 4 Drawing Figures

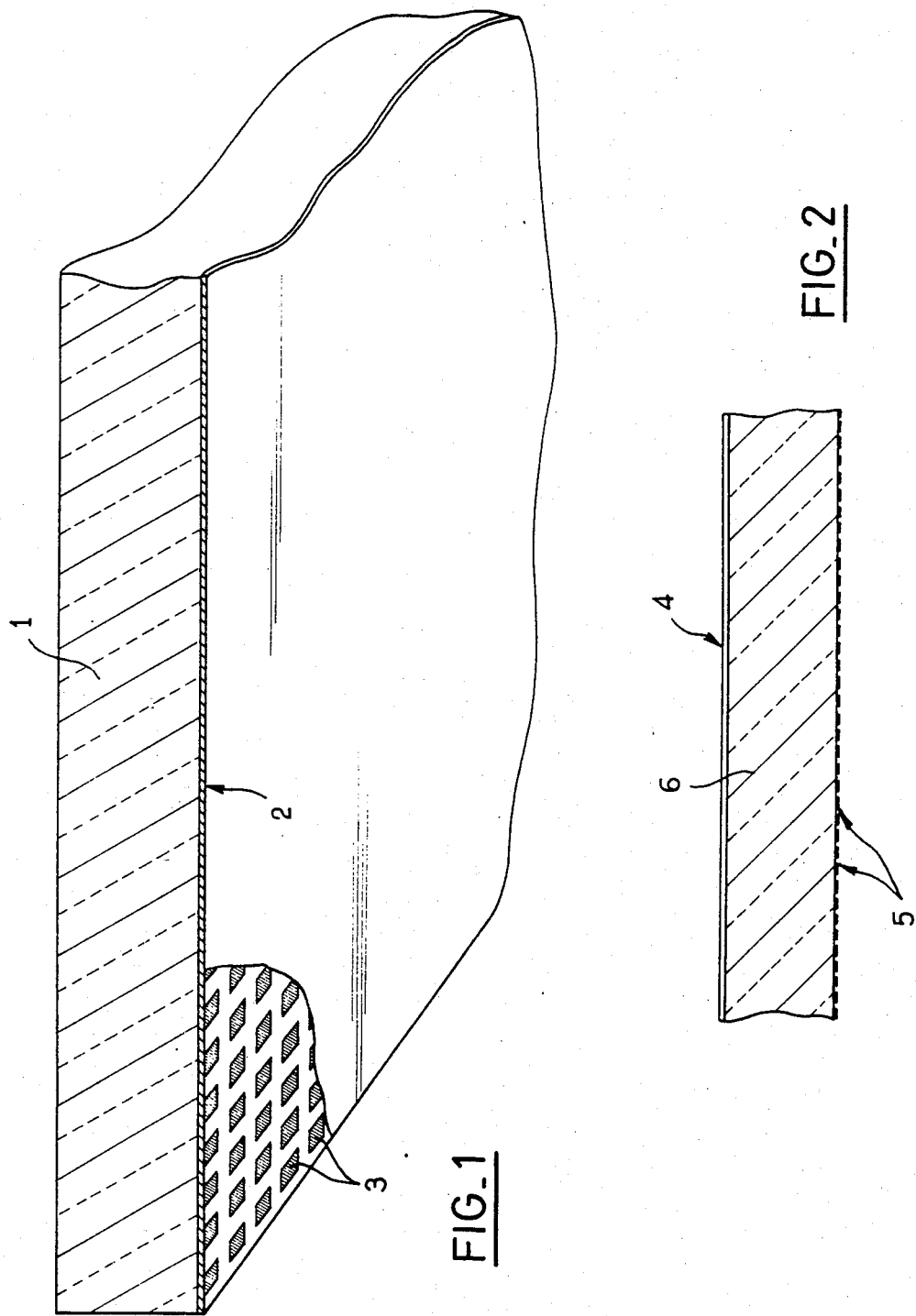

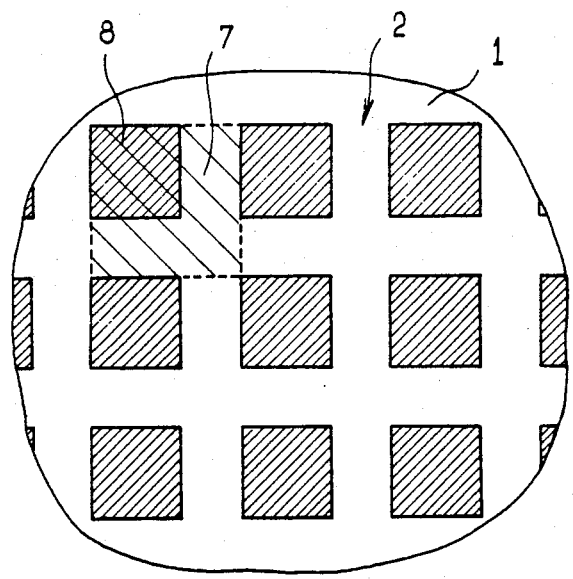
FIG_3
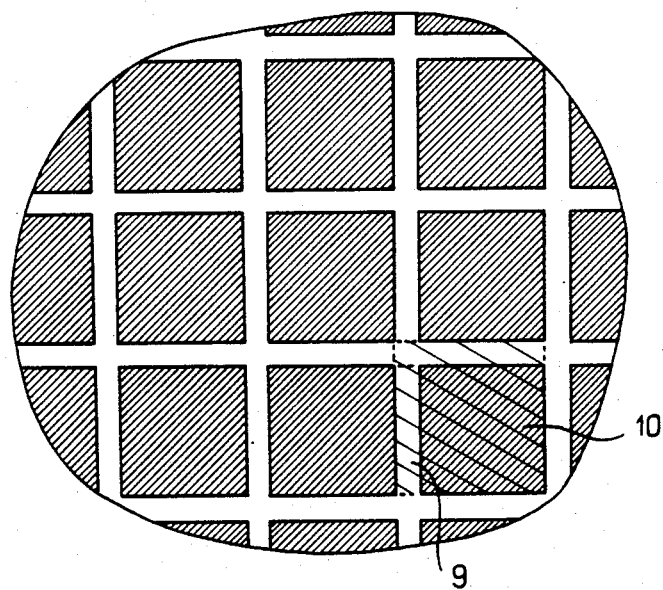
FIG_4

GLASS FOR PANORAMIC ROOF

BACKGROUND OF THE INVENTION

1. Field of the Invention

This invention relates to a glass intended to be used particularly as a panoramic roof for motor vehicles.

2. Description of the Prior Art

A panoramic roof lights the inside of a vehicle so equipped through the top, creating a less limited environment, closer to nature than the usual opaque roofs. To limit, particularly, the risks of glare and to improve the visual and thermal comfort of the passengers, a panoramic roof should be made of glass meeting certain conditions: Thus, light transmission through the glass should be limited, the light transmission factor preferably being less than 25%. Further, it is essential that the energy transmission also be limited, so as to avoid creating a greenhouse effect.

Herein energy transmission is understood to mean solar energy entering by direct transmission.

Various types of glass have already been proposed to be used as panoramic roofs, however, they fail to meet one or more of the required conditions.

A glass is known, for example, that is made of a sheet of glass tinted throughout and covered with a thin semireflective layer. A light transmission factor on the order of 25% and an energy transmission factor (ETF) on the order of 30% can be obtained by using this glass. However, it is impossible to attain still lower light and energy transmission factors, of a value on the order of 10 to 15% which are desirable to increase the feeling of comfort. Although, by increasing the thickness of the semireflective layer, particularly beyond about 80 nanometers, these low coefficient values can in fact be attained such a thickness results in marked iridescence and unacceptably high interference.

A glass is also known that is made up of a sheet of clear glass covered with a network of enamel points which, theoretically, make it possible to lower the light transmission factor as much as desired by increasing the surface covered by these points, but in practice, since the energy transmission factor in such a glass is always greater than the light transmission factor, it remains impossible to lower the overall energy transmission factor to values less than 25%, while retaining sufficient lighting.

Automobile manufacturers are increasingly demanding in regard to the qualities of glasses intended for vehicles, particularly as panoramic roofs, and the characteristics of known glasses do not meet these demands.

Another obstacle encountered is that infrared radiation can cause eye fatigue and, for this reason, efforts have been made to develop glasses for which the energy transmission factor is preferably less than the light transmission factor, or at least for which the two factors are very close to one another, while being low enough to maintain a feeling of comfort.

This invention provides a new glass structure that overcomes these prior art problems and makes available glass suitable for application as a panoramic roof for motor vehicles, satisfying an increasing need in the industry.

SUMMARY OF THE INVENTION

The glass according to the invention comprises a sheet of tinted glass and coated with a network of enamel patterns, for example, square or rectangular points, etc., so that the light transmission factor is less than 30%, preferably less than 15%, and the energy transmission factor is of the same order of magnitude and is, preferably, approximately equal.

The nature and properties of the substrate made up of the glass sheet must be carefully controlled to obtain the desired properties in the glass. Preferably, the glass sheet has thickness of at least 5 mm. To further reduce values of the light transmission factor, on the order of 10%, it is possible to provide on the glass a design of network of enamel patterns. It is possible to use networks whose light transmission factor is between 15 and 30%.

Thus, in a preferred embodiment of the invention, a tinted glass sheet such as described in French Pat. No. 2,330,556 is used as the substrate which exhibits, for example, a light transmission factor greater than 70% for a thickness of 3 mm and an energy transmission factor (ETF) in the neighborhood of 60%. A network of enamel patterns, having a light transmission factor preferably between 15 and 30%, is deposited on the substrate. The panoramic roof obtained thereby exhibits a light transmission factor on the order of 10 to 15% and an energy transmission factor on the order of 10 to 15%.

In an alternative embodiment of the invention, the glass comprises a sheet of tinted glass, coated with a network of enamel patterns and a thin semireflective layer. In this embodiment, the semireflective layer is preferably placed on the outside of the passenger space and the network of enamel patterns is advantageously placed on the inside of the passenger space. Actually, because of the weather and abrasions to which this type of vehicle glass is subject, it is preferable to direct the network toward the inside of the passenger space to preserve the properties of the glass.

In this embodiment, the semireflective layer, obtained from a solution of organometallic compounds that are converted into metal oxides under the action of heat, should be compatible with the network of enamel patterns and particularly with its usual fabrication process, for example, by silk screening. Thus, according to the invention, a semireflective layer, obtained from a mixture of iron, chromium, and cobalt organometallic compounds, is preferable.

The layer is such that the light transmission factor of the glass sheet coated with the layer is less than 35%, the light transmission factor of the network being between 20 to 80%, preferably less than 50%.

To make a glass for a panoramic roof according to the invention, optionally coated with a semireflective layer, the following process can be followed:

The glass sheet is made by the float process in which the molten glass composition is poured on a metal bath made up of molten tin on which it advances while progressively cooling to form a glass ribbon inside a protective enclosure. After removal from the molten bath, the glass ribbon is subjected to the deposit of a thin semireflective layer, for example, by using the device described in the publication of French Pat. No. 2,176,760 by which a solution of metal compounds is sprayed uniformly and continuously on the glass ribbon. Under the action of the heat from the glass ribbon, these metal substances decompose into metal oxides which form a layer on the surface of the glass ribbon. The glass ribbon, thus coated with a semireflective layer, goes into a thermal enclosure where it is annealed. It is then cut and shaped. Then the opaque network is deposited with an enamel paste known in the art, for example, by the usual silk screen process and by using a silk screen. Then the glass is subjected to further current heating operations during which the enamel is baked and the glass tempered and bent.

Other characteristics and advantages of the invention are described hereinbelow.

BRIEF DESCRIPTION OF THE DRAWINGS

FIG. 1 illustrates a glass sheet according to the invention coated with a semireflective layer and a network of enamel patterns.

FIG. 2 is a side view of glass sheet in which a network of enamel patterns is deposited on the face opposite the one whereon a semireflective layer is formed.

FIGS. 3 and 4 represent examples of the network design with a base of enamel points.

DETAILED DESCRIPTION OF THE INVENTION

The glass shown in FIG. 1 comprises a glass sheet 1, tinted covered with a thin semireflective layer 2 and a network of enamel points 3.

In FIG. 2, a semireflective layer 4 and network of enamel points 5 are located on opposite sides of a glass sheet 6.

In these two embodiments, the face covered with the network is always directed toward the inside of the passenger space to assure a better protection of said network while in the embodiment of the invention shown in FIG. 2, the semireflective layer can be directed outward.

This invention can be better understood by reference to the following examples, which are provided for purposes of illustration only, and are not intended to limit the invention.

EXAMPLE 1

A glass sheet is formed and received at the output of a production line of a float glass, tinted and having the following characteristics:
thickness: 4 mm
light transmission factor (LTF): 56%
energy transmission factor (ETF): 60%
energy absorption factor: 74%

After cutting and shaping of the glass, an enamel paste, e.g., a paste marketed under designation J 402 by the H.P.C. Company, is deposited on the glass with a silk screen forming a network of enamel points having the design illustrated in FIG. 4: the repetitive pattern 9 is a square about 1100 microns on the side, comprising an enamel square 10 about 950 microns on the side, deposited in the lower right corner of the repetitive pattern. Thus, a proportion of transparent surface and therefore a light transmission factor of 25% is obtained.

The resulting glass exhibits an LTF of 14% and an ETF of 15%.

EXAMPLE 2

A glass sheet is formed and received at the output of a tin bath for fabrication of a float glass, tinted and having the following characteristics:
thickness: 5 mm
light transmission factor: 73%
energy transmission factor: 58%

There is deposited by spraying a solution of an organometallic compound of cobalt, iron and chromium, as described in the publication of French Pat. No. 2,366,230 comprising 0.9% by weight of cobalt, having a ratio by weight of iron to cobalt of 1.35, the sum of the iron, chromium, cobalt metals representing 2.65% by weight of the organometallic compound. The solvent used is ethyl acetate.

The thickness of the deposited layer is about 60 to 80 nanometers.

After cutting and shaping of glass 1, there is deposited on semireflective layer 2 an enamel paste, e.g., a paste marketed under the designation J 402 by the H.P.C. Company, with a silk screen forming a network of enamel points having the design shown in FIG. 3. The repetitive pattern 7 is a square about 1100 microns on the side, comprising an enamel square 8 about 660 microns on the side, deposited in the upper left corner of the repetitive pattern. Thus, a proportion of transparent surface and therefore a light transmission factor of 66% is obtained.

The following table recapitulates the characteristics of the various elements of the glass thus made. The abbreviations used are:
LTF: light transmission factor
ETF: energy transmission factor
t: thickness

|  | t | LTF | ETF |
| --- | --- | --- | --- |
| glass sheet | 5 mm | 73% | 58% |
| glass sheet + FeCrCo layer |  | 33% | 35% |
| FeCrCo layer | 60 nm | — | — |
| network, FIG. 3 |  | 66% |  |
| glass |  | 24% | 26% |

EXAMPLE 3

The conditions are the same as in example 2 but a network, represented in FIG. 4 and described with reference to Example 1, is used. The resulting glass is a particularly advantageous embodiment of the invention since it exhibits the following characteristics:
ETF: 10%
LTR: 10%

The invention has been disclosed will regard to specific embodiments and examples. In particular, various designs, compositions and characteristics have been set forth. Except where otherwise indicated these are not intended to limit the invention. Variations will occur to those of ordinary skill in the art without the exercise of inventive faculty, and remain within the scope of the invention as claimed below.

What is claimed as new and is intended to be secured by Letters Patent is:

1. A glass suitable for use as a panoramic roof for motor vehicles, comprising a tinted glass sheet coated with a network of enamel patterns, having a light transmission factor less than 30% and having an energy transmission factor less than 30%, both factors being approximately equal.

2. The glass of claim 1, wherein the glass sheet is at least 5 mm thick.

3. The glass of claim 1 or 2, wherein the network of enamel patterns has a light transmission factor between 15 and 30%.

4. The glass of claim 1 or 2, further comprising a semireflective layer formed on said glass sheet.

5. The glass of claim 4, wherein the semireflective layer is made up of an organometallic mixture comprising iron, chromium and cobalt compounds.

6. The glass of claim 4, wherein the glass sheet coated with the semireflective layer has a light transmission factor less than 35% and the network of enamel patterns has a light transmission factor between 20 to 80%.

7. The glass of claim 4, wherein the network of enamel patterns is deposited on the semireflective layer.

8. The glass of claim 4, wherein the light transmission factor and energy transmission factor are approximately equal and less than 15%.

9. The glass of claim 4, wherein said light and energy transmission factors are between 10–15%.

10. The glass of claim 1, wherein said enamel patterns comprise a repeating pattern of enamel squares having a side of about 950 microns set within a square of said glass sheet about 1100 microns on a side.

11. The glass of claim 1, wherein said enamel patterns comprise a repeating pattern of enamel squares about 660 microns on a side set within a square of said glass sheet about 1100 microns on a side.

12. The glass of claim 4, wherein said glass comprises the roof of an automotive vehicle, defining thereby a passenger space within said vehicle, wherein said network of enamel pattern is coated on the side facing said passenger space and said semireflective layer is coated on the opposite side.

13. The glass of claim 1, wherein said enamel patterns are repeating patterns of enamel squares.

* * * * *